US011193455B2

United States Patent
Jin

(10) Patent No.: US 11,193,455 B2
(45) Date of Patent: Dec. 7, 2021

(54) TURBOCHARGER

(71) Applicants: Hyundai Motor Company, Seoul (KR); Kia Motors Corporation, Seoul (KR)

(72) Inventor: Seok Beom Jin, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 45 days.

(21) Appl. No.: 16/743,841

(22) Filed: Jan. 15, 2020

(65) Prior Publication Data
US 2021/0054810 A1 Feb. 25, 2021

(30) Foreign Application Priority Data
Aug. 22, 2019 (KR) .................. 10-2019-0102909

(51) Int. Cl.
*F02M 26/34* (2016.01)
*F02B 37/00* (2006.01)
*F02M 26/17* (2016.01)

(52) U.S. Cl.
CPC ............. *F02M 26/34* (2016.02); *F02B 37/00* (2013.01); *F02M 26/17* (2016.02)

(58) Field of Classification Search
CPC ........ F02M 26/34; F02M 26/17; F02B 37/00; F02B 33/00; F01M 13/021; F01M 13/00; F01M 13/02; F04D 29/44; F04D 29/422; F04D 29/4213
USPC ............. 60/605.1, 605.2, 611; 123/572–574; 415/58.4, 206
See application file for complete search history.

(56) References Cited

U.S. PATENT DOCUMENTS

| 4,990,053 A * | 2/1991 | Rohne ................... F04D 29/685 415/58.4 |
| 6,123,061 A * | 9/2000 | Baker .................. F01M 13/021 123/573 |
| 6,447,241 B2 * | 9/2002 | Nakao ................. F04D 29/4213 415/58.4 |
| 7,021,058 B2 * | 4/2006 | Scheinert ............ F04D 29/4213 60/611 |
| 7,204,241 B2 * | 4/2007 | Thompson ........... F01M 13/021 123/572 |
| 7,624,575 B2 * | 12/2009 | Noelle ................ F04D 29/4213 60/605.1 |
| 8,161,745 B2 * | 4/2012 | Dorie ...................... F02B 37/16 60/605.1 |

(Continued)

FOREIGN PATENT DOCUMENTS

JP      2009013814 A  *  1/2009
JP      5047352 B2       10/2012

(Continued)

*Primary Examiner* — Thai Ba Trieu
(74) *Attorney, Agent, or Firm* — Mintz Levin Cohn Ferris Glovsky and Popeo, P.C.; Peter F. Corless

(57) ABSTRACT

A turbocharger is provided and includes a compressor housing and a recirculation slit and a recirculation passage provided at an inlet of the compressor housing to enable air flowing into the compressor to be recirculated. A gas supply part supplies blow-by gas towards the inlet of the compressor housing to allow blow-by gas to be joined with air recirculated through the recirculation slit and the recirculation passage and to guide recirculating air towards a compressor wheel.

9 Claims, 6 Drawing Sheets

(56) References Cited

U.S. PATENT DOCUMENTS

| | | | | |
|---|---|---|---|---|
| 8,322,138 B2* | 12/2012 | Jackson | ............... | F01M 13/022 |
| | | | | 123/572 |
| 8,696,310 B2* | 4/2014 | Dillon | ................. | F04D 29/4206 |
| | | | | 415/206 |
| 9,003,791 B2* | 4/2015 | Ibaraki | ................ | F04D 29/4213 |
| | | | | 415/58.4 |
| 9,217,444 B2* | 12/2015 | Berger | ................ | F04D 29/4213 |
| 9,518,591 B2* | 12/2016 | Schmitt | ............... | F04D 29/4213 |
| 9,528,431 B2* | 12/2016 | Palko | .................. | F04D 29/4206 |
| 10,578,048 B2* | 3/2020 | Styles | ................ | F04D 29/4213 |
| 10,808,655 B2* | 10/2020 | Patil | .................... | F02B 29/0406 |
| 2015/0337863 A1* | 11/2015 | Tomita | ................. | F04D 29/053 |
| | | | | 415/58.4 |
| 2018/0073451 A1* | 3/2018 | Ozawa | .................... | F02B 37/16 |
| 2019/0055952 A1* | 2/2019 | Anschel | ................. | F02B 37/16 |

FOREIGN PATENT DOCUMENTS

| | | |
|---|---|---|
| JP | 6213373 B2 | 10/2017 |
| KR | 101184465 B1 | 9/2012 |
| KR | 101807020 B1 | 12/2017 |

* cited by examiner

TURBOCHARGER

CROSS REFERENCE TO RELATED APPLICATION

The present application claims priority of Korean Patent Application No. 10-2019-0102909 filed on Aug. 22, 2019, the entire contents of which is incorporated herein for all purposes by this reference.

BACKGROUND

Field of the Disclosure

The present disclosure relates to a structure of a turbocharger which drives a turbine using exhaust gas of an engine to supercharge intake air to be supplied to the engine, by a compressor.

Description of the Related Art

When an intake air throttling is performed to activate a post-exhaust treatment device of an engine by increasing a temperature, a pressure at an outlet of a compressor of a turbocharger is rapidly increased, which causes a surge phenomenon of the compressor. As a result, a phenomenon in which air flowing into an inlet side of the compressor flows back occurs. On the other hand, an upstream side of the compressor is configured to allow blow-by gas to be supplied thereto such that blow-by gas is mixed with air flowing into the inlet side of the compressor and is then transmitted to a combustion chamber, and a back flow phenomenon of air as described above causes a contamination of an air cleaner, an air flow sensor or the like, which results from blow-by gas.

The foregoing described is intended merely to aid in the understanding of the background of the present disclosure, and should not be taken as acknowledging that they fall within the purview of the related art that is already known to those skilled in the art.

SUMMARY

An object of the present disclosure is to provide a turbocharger which suppresses an occurrence of surge or solves a surge condition even in a situation in which the surge in a compressor is caused by a sudden increase in the pressure of an outlet side of the compressor and which enables blow-by gas not to contaminate other components such as an air cleaner, an airflow sensor or the like, installed in an intake air pipe, or reduces contamination.

In order to achieve the above object, a turbocharger of the present disclosure may include a compressor housing; a recirculation slit and a recirculation passage disposed at an inlet of the compressor housing to enable air flowing into the compressor to be recirculated; and a gas supply part configured to supply blow-by gas towards the inlet of the compressor housing to allow blow-by gas to be joined with air recirculated through the recirculation slit and the recirculation passage and to guide recirculating air towards a compressor wheel.

The gas supply part may include a gas inlet that receives blow-by gas; a guide passage configured to guide a flow of blow-by gas in a direction opposite to a flow direction of air discharged from the recirculation passage; and a distribution passage configured to supply blow-by gas supplied through the gas inlet, to the guide passage. The recirculation passage may be formed in a cylindrical shape surrounding a perimeter of the inlet of the compressor, and the guide passage may be formed in a cylindrical shape facing the recirculation passage and forming a concentric axis therewith.

The guide passage may be formed in a conical cylinder shape that is gradually narrowed towards the recirculation passage (e.g., having a diameter that gradually decreases toward the recirculation passage). The recirculation passage may be formed to have a cross-sectional shape in which an inner surface of the recirculation passage is gradually inclined toward a center of the inlet of the compressor as it goes towards the guide passage. The distribution passage may be formed in a ring shape surrounding an outer side of the guide passage to be in communication with the gas inlet and in communication with the guide passage through a plurality of apertures.

Additionally, a guide protrusion, which guides air discharged through the recirculation passage and gas discharged through the guide passage to allow discharged air and gas to flow towards a center of the inlet of the compressor, may be formed on a portion at which the recirculation passage and the guide passage meet or intersect. The gas supply part and the guide protrusion may be integrally formed on the compressor housing. Alternately, the gas supply part and the guide protrusion may be formed separately to be coupled to the compressor housing.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A turbocharger according to the exemplary embodiments of the present disclosure will be described below with reference to the accompanying drawings.

Figure 1:
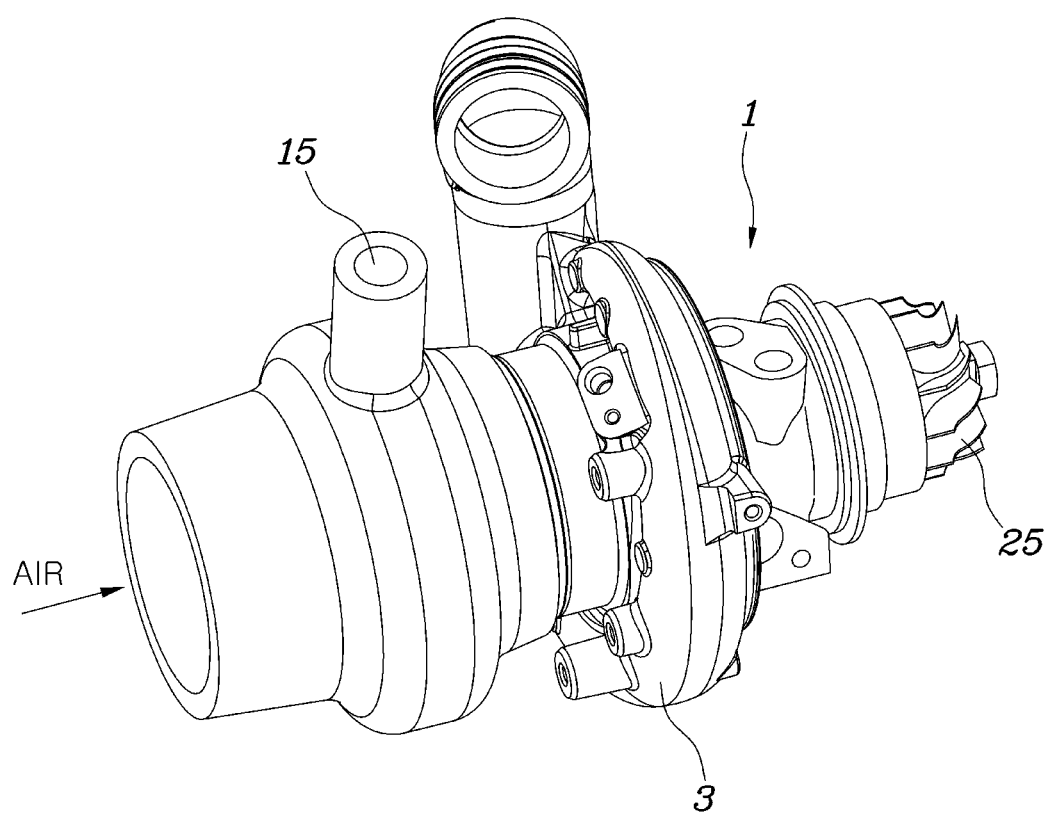
FIG. 1 is a view illustrating a turbocharger according to an exemplary embodiment of the present disclosure.
Figure 2:
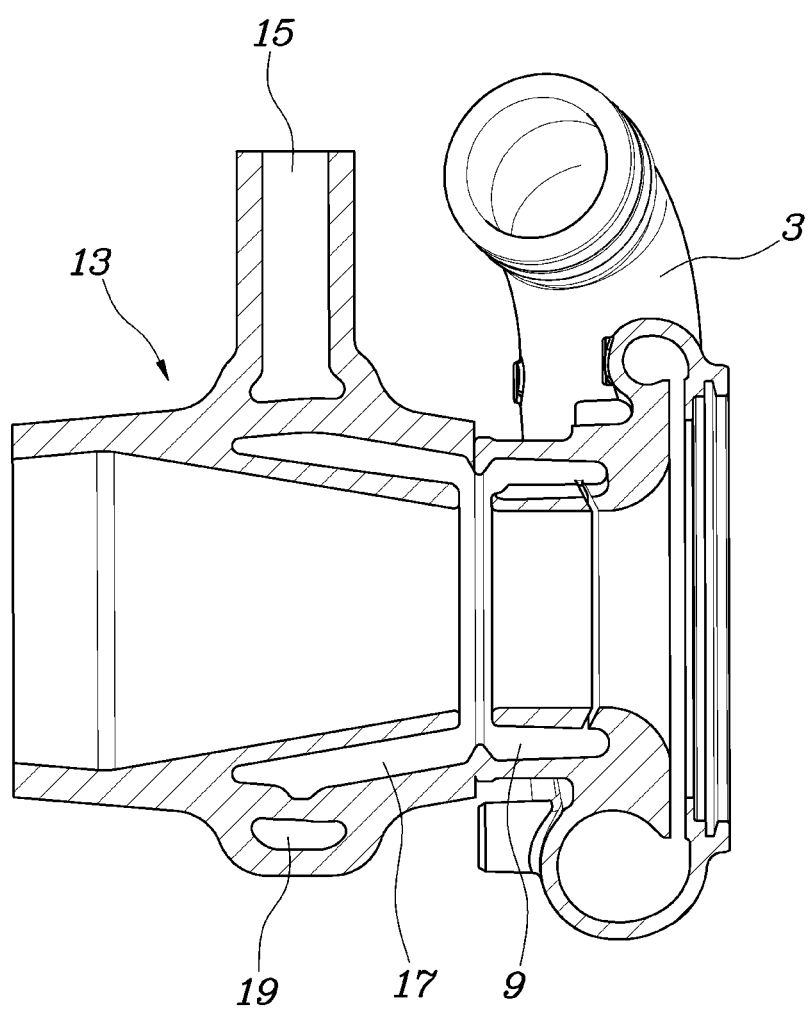
FIG. 2 is a cross-sectional view of a major part of FIG. 1 according to an exemplary embodiment of the present disclosure.
Figure 3:
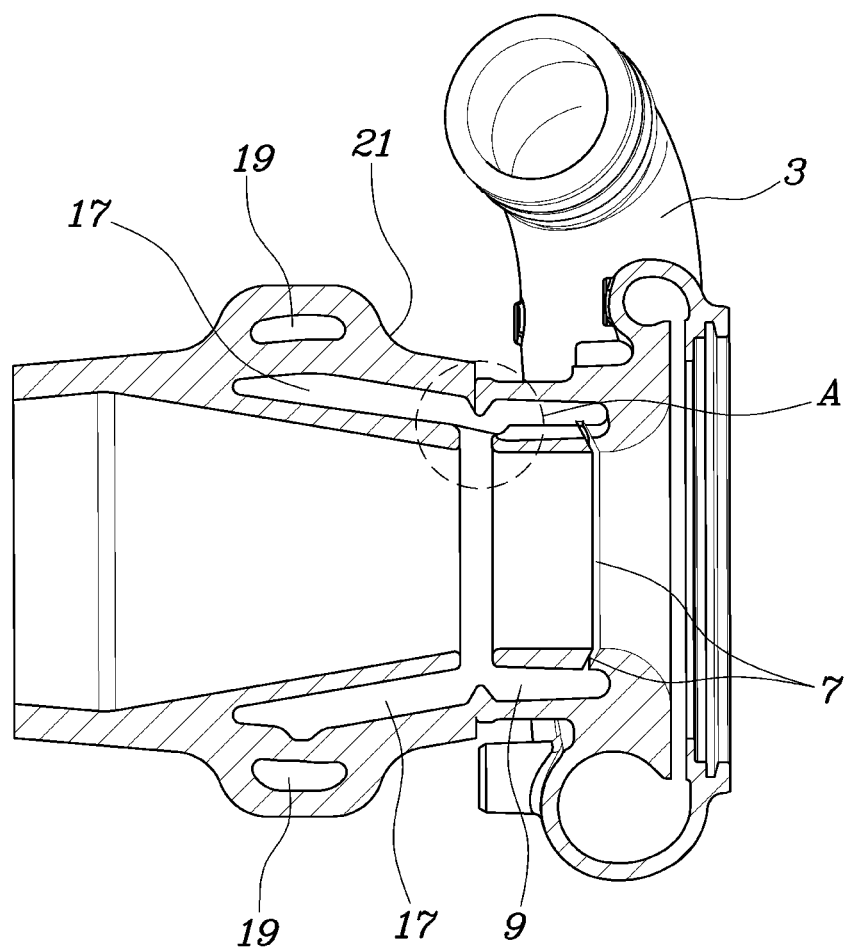
FIG. 3 is a view of the major part of FIG. 2 observed from a different angle according to an exemplary embodiment of the present disclosure.
Figure 4:
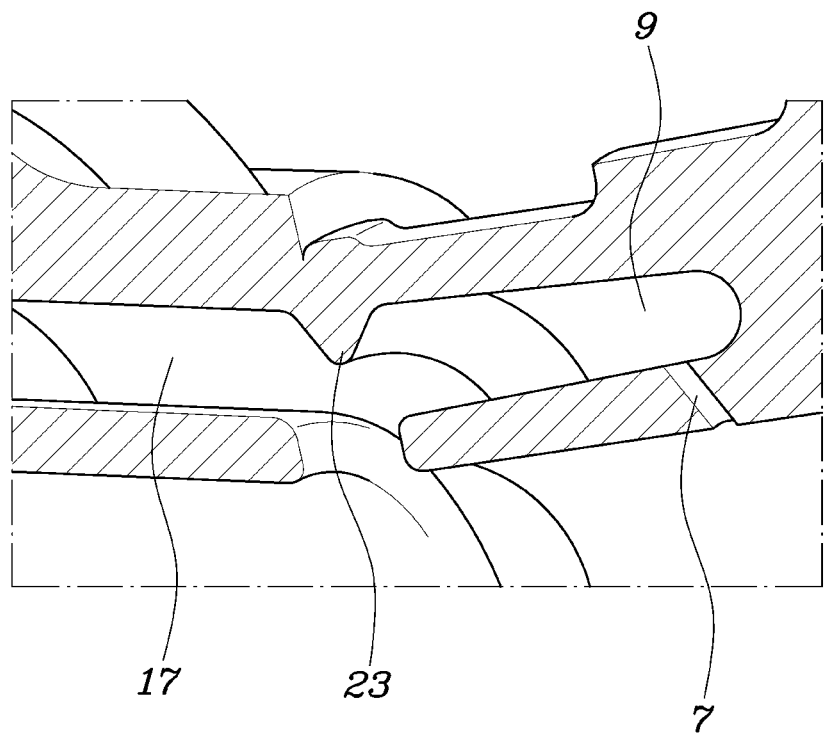
FIG. 4 is a detail view of "A" part of FIG. 3 according to an exemplary embodiment of the present disclosure.

FIG. 1 depicts a configuration of a turbocharger 1 according to the present disclosure. In particular, at a side on which a turbine driven by exhaust gas is mounted, a turbine housing is omitted and a turbine wheel 25 provided in the turbine housing is exposed. In addition, a compressor housing 3 is provided at a side on which a compressor configured to compress air is mounted.

Referring to FIGS. 1 to 6, an exemplary embodiment of the turbocharger 1 according to the present disclosure may include the compressor housing 3; a recirculation slit 7 and a recirculation passage 9 provided at an inlet 5 of the compressor housing 3 to enable air flowing into the compressor to be recirculated; and a gas supply part 13 configured to supply blow-by gas towards the inlet of the compressor housing 3 to allow blow-by gas to be joined with air recirculated through the recirculation slit 7 and the recirculation passage 9 and to guide recirculating air towards a compressor wheel 11.

In the turbocharger 1 of the present disclosure, the recirculation slit 7 and the recirculation passage 9 may be formed to allow some of air flowing into the compressor to be recirculated when a surge occurs in the compressor, and a flow of air recirculated through the recirculation slit 7 and the recirculation passage 9 may be guided towards the compressor wheel 11, which is provided at the inlet of the compressor, by a flow of blow-by gas flowing thereinto through the gas supply unit 13.

Figure 5:
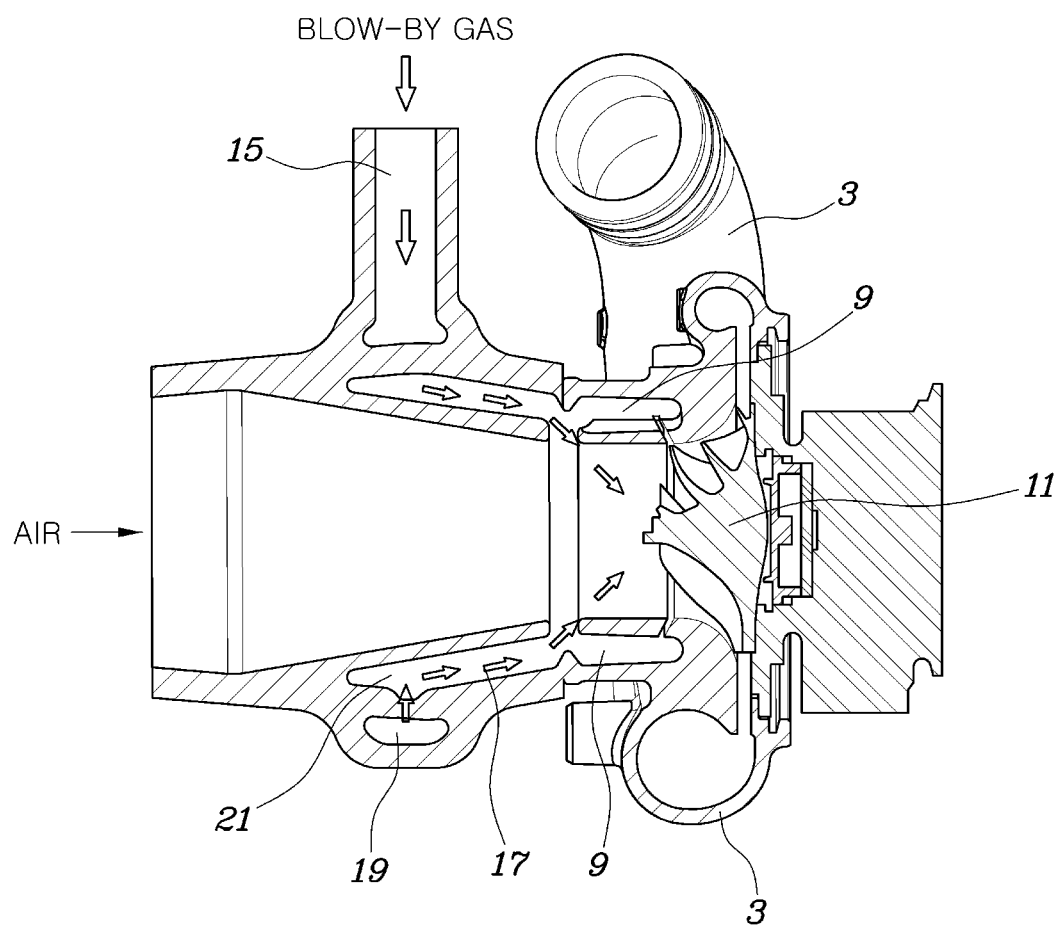
FIG. 5 is a view describing a flow of blow-by gas when the turbocharger is in a normal operating state according to an exemplary embodiment of the present disclosure.
Figure 6:
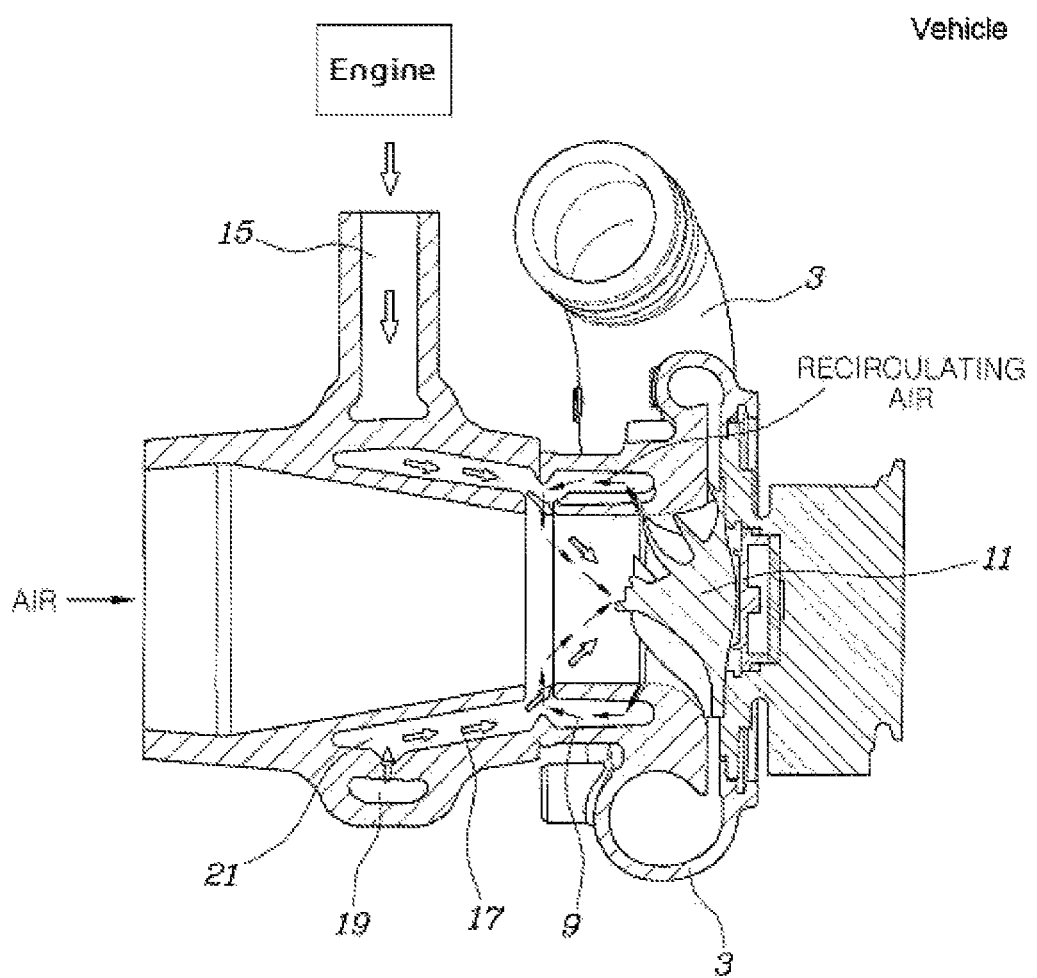
FIG. 6 is a view describing flows of blow-by gas and recirculating air in a situation in which a surge is occurred by intake air throttling in the turbocharger according to an exemplary embodiment of the present disclosure.

Before the surge of the compressor occurs, blow-by gas may flow into the inlet of the compressor through the gas supply part 13 as shown in FIG. 5, may be mixed with air, and then may move or flow towards the compressor wheel 11. In addition, when the surge is about to occur or has occurred due to an intake air throttling in the compressor, some of air flowing into the compressor may be recycled through the recirculation slit 7 and the recirculation passage 9 as illustrated in FIG. 6. At this time, blow-by gas may flow into a flow path, which is substantially the same as that shown in FIG. 5, by flow inertia and guides recirculating air towards the compressor wheel 11, thereby delaying or rapidly relieving occurrence of the surge of the compressor.

In addition, as described above, blow-by gas forms a flow discharged from a location adjacent to the compressor wheel 11 towards the compressor wheel 11 through the gas supply part 13 as illustrated in FIG. 5, and flows toward the compressor wheel 11 even in a surge situation as illustrated in FIG. 6. Therefore, unlike the prior art, it may be possible to prevent other components such as an air cleaner, an airflow sensor or the like disposed upstream of an intake air pipe from being contaminated by a back flow of blow-by gas.

In this exemplary embodiment, the gas supply unit 13 may include a gas inlet 15 provided to receive blow-by gas; a guide passage 17 configured to guide a flow of blow-by gas in a direction opposite to a flow direction of air discharged from the recirculation passage 9; and a distribution passage 19 configured to supply blow-by gas supplied through the gas inlet 15, to the guide passage 17. In addition, the distribution passage 19 may be formed in a ring shape surrounding an outer side of the guide passage 17 to be in communication with the gas inlet 15 and in communication with the guide passage 17 through a plurality of apertures 21.

In other words, when blow-by gas is supplied to the gas inlet 15 through a separate blow-by gas hose or the like, the blow-by gas may be supplied to the guide passage 17 through the distribution passage 19 and the apertures 21. On the other hand, the recirculation passage 9 may be formed in a cylindrical shape surrounding a perimeter of the inlet of the compressor, and the guide passage 17 may be formed in a cylindrical shape facing the recirculation passage 9 and forming a concentric axis therewith.

The guide passage 17 may be formed in a conical cylinder shape that is gradually narrowed towards the recirculation passage 9 (e.g., with a gradually decreasing diameter towards the recirculation passage), and the recirculation passage 9 may be formed to have a cross-sectional shape in which an inner surface of the recirculation passage 9 is gradually inclined toward a center of the inlet of the compressor as it goes towards the guide passage 17. In addition, a guide protrusion 23 may be provided on a portion at which the recirculation passage 9 and the guide passage 17 meet or intersect, and the guide protrusion may guide air discharged through the recirculation passage 9 and gas discharged through the guide passage 17 to allow discharged air and gas to flow towards a center of the inlet of the compressor.

Therefore, as illustrated in FIG. 6, blow-by gas flowing towards a center of the inlet of the compressor through the guide passage 17 may be recirculated through the recirculation passage 9 to form a flow by which discharged air is pushed towards a center of the inlet of the compressor, and thus, the surge of the compressor may be terminated more rapidly. In this exemplary embodiment, the gas supply part 13 and the guide protrusion 23 may be formed integrally on the compressor housing 3. Alternately, the gas supply part 13 and the guide protrusion 23 may be formed as separate structures to be separated as shown in FIG. 5 and then coupled to the compressor housing 3.

The present disclosure may suppress an occurrence of surge, or may rapidly solve a surge condition even when the surge of in the compressor is caused by a sudden increase in the pressure of an outlet side of the compressor. Furthermore, the present disclosure enables blow-by gas to prevent other components such as an air cleaner, an airflow sensor or the like, installed in the intake air pipe, from being contaminated.

Although the present disclosure has been illustrated and described with respect to the exemplary embodiments, it will be apparent to those skilled in the art that the present disclosure can be variously changed and modified without departing from the technical spirit of the present disclosure provided by the following claims

What is claimed is:

1. A turbocharger, comprising:
   a compressor housing;

a recirculation slit and a recirculation passage provided at an inlet of the compressor housing to enable air flowing into the compressor to be recirculated; and a gas supply part in which blow-by gas from an engine flows towards the inlet of the compressor housing to allow blow-by gas to be joined with air recirculated through the recirculation slit and the recirculation passage and to guide recirculating air towards a compressor wheel, wherein the gas supply part includes a guide passage configured to guide a flow of the blow-by gas from the engine in a direction opposite to a flow direction of air discharged from the recirculation passage, and wherein a guide protrusion, which guides air discharged through the recirculation passage and gas discharged through the guide passage to allow discharged air and gas to flow towards a center of the inlet of the compressor, is provided on a portion at which the recirculation passage and the guide passage intersect.

2. The turbocharger of claim 1, wherein the gas supply part further includes:
a gas inlet through which blow-by gas is received; and
a distribution passage configured to supply the blow-by gas supplied through the gas inlet, to the guide passage.

3. The turbocharger of claim 2, wherein the recirculation passage is formed in a cylindrical shape surrounding a perimeter of the inlet of the compressor, and the guide passage is formed in a cylindrical shape facing the recirculation passage and forming a concentric axis therewith.

4. The turbocharger according to claim 3, wherein the guide passage is formed in a conical cylinder shape with a diameter that gradually decreases towards the recirculation passage.

5. The turbocharger of claim 4, wherein the recirculation passage is formed to have a cross-sectional shape in which an inner surface of the recirculation passage is gradually inclined toward a center of the inlet of the compressor along the guide passage.

6. The turbocharger of claim 3, wherein the distribution passage is formed in a ring shape surrounding an outer side of the guide passage to be in communication with the gas inlet and to be in communication with the guide passage through a plurality of apertures.

7. The turbocharger of claim 1, wherein the gas supply part and the guide protrusion are formed integrally on the compressor housing.

8. The turbocharger of claim 1, wherein the gas supply part and the guide protrusion are formed separately to be coupled to the compressor housing.

9. A vehicle having a turbocharger, the turbocharger comprising,
a compressor housing;
a recirculation slit and a recirculation passage provided at an inlet of the compressor housing to enable air flowing into the compressor to be recirculated; and
a gas supply part in which blow-by gas from an engine flows towards the inlet of the compressor housing to allow blow-by gas to be joined with air recirculated through the recirculation slit and the recirculation passage and to guide recirculating air towards a compressor wheel,
wherein the gas supply part includes a guide passage configured to guide a flow of the blow-by gas from the engine in a direction opposite to a flow direction of air discharged from the recirculation passage, and
wherein a guide protrusion, which guides air discharged through the recirculation passage and gas discharged through the guide passage to allow discharged air and gas to flow towards a center of the inlet of the compressor, is provided on a portion at which the recirculation passage and the guide passage intersect.

* * * * *